United States Patent
Blum et al.

[11] Patent Number: 6,106,905
[45] Date of Patent: Aug. 22, 2000

[54] COATING ARTICLES USING RADIATION-CURABLE POWDER COATINGS

[75] Inventors: Rainer Blum, Ludwigshafen; Christopher Hilger; Joachim Woltering, both of Münster, all of Germany

[73] Assignee: BASF Lacke + Farben Aktiengesellschaft, Muenster, Germany

[21] Appl. No.: 09/101,289
[22] PCT Filed: Dec. 30, 1996
[86] PCT No.: PCT/EP96/05864
§ 371 Date: Jan. 8, 1999
§ 102(e) Date: Jan. 8, 1999
[87] PCT Pub. No.: WO97/25157
PCT Pub. Date: Jul. 17, 1997

[30] Foreign Application Priority Data

Jan. 4, 1996 [DE] Germany ............ 196 00 147

[51] Int. Cl.$^7$ .................................... B05D 3/06
[52] U.S. Cl. ................. 427/493; 427/519; 427/520; 427/195
[58] Field of Search ............... 427/508, 185, 427/189, 493, 519, 520, 195

[56] References Cited

U.S. PATENT DOCUMENTS

| | | | |
|---|---|---|---|
| 3,919,347 | 11/1975 | Katsimbas | 260/836 |
| 3,926,639 | 12/1975 | Rosen et al. | 96/115 |
| 3,974,303 | 8/1976 | Iwase et al. | 427/27 |
| 4,037,038 | 7/1977 | Tsuchiya | 526/56 |
| 4,129,488 | 12/1978 | McGinniss | 204/159 |
| 4,144,212 | 3/1979 | Linder et al. | 260/29 |
| 4,163,763 | 8/1979 | Tsuchiya et al. | 525/290 |
| 4,163,810 | 8/1979 | McGinniss | 427/54 |
| 4,176,146 | 11/1979 | Tsuchiya et al. | 525/338 |
| 4,233,420 | 11/1980 | Tsuchiya et al. | 525/310 |
| 4,235,981 | 11/1980 | Tsuchiya | 525/244 |
| 4,307,002 | 12/1981 | Wagner et al. | 260/22 |
| 4,322,504 | 3/1982 | Wagner et al. | 525/7.1 |
| 4,839,399 | 6/1989 | Sato et al. | 522/14 |
| 5,026,806 | 6/1991 | Rehmer et al. | 526/316 |
| 5,073,611 | 12/1991 | Rehmer et al. | 526/208 |
| 5,128,386 | 7/1992 | Rehmer et al. | 522/35 |
| 5,223,645 | 6/1993 | Barwich et al. | 564/158 |
| 5,264,533 | 11/1993 | Rehmer et al. | 526/301 |
| 5,276,069 | 1/1994 | Rehmer et al. | 522/35 |
| 5,294,688 | 3/1994 | Rehmer et al. | 526/260 |
| 5,389,699 | 2/1995 | Rehmer et al. | 522/35 |
| 5,558,911 | 9/1996 | Blum | 427/517 |

FOREIGN PATENT DOCUMENTS

| | | |
|---|---|---|
| 448741 | 10/1991 | European Pat. Off. |
| 2641662 | 3/1978 | Germany . |
| 19600147 | 7/1997 | Germany . |
| 2010248 | 6/1979 | United Kingdom . |

Primary Examiner—Erma Cameron
Attorney, Agent, or Firm—Keil & Weinkauf

[57] ABSTRACT

The invention relates to a method of coating articles with powder coatings which contain polymers, are applied to the surface of the substrate to be coated, are melted and are crosslinked by UV irradiation, wherein the polymers employed are copolymers of a) at least one monomer of the general formula (I)

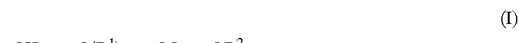

(I)

where $R^1$=H or $CH_3$ and
$R^2$=H, $C_nH_{2n+1}$ where n=from 1 to 30, or is an alicyclic, araliphatic or heterocyclic radical, hydroxyalkyl, alkoxyalkyl, glycidyl or aminoalkyl,
or of the general formula (II)

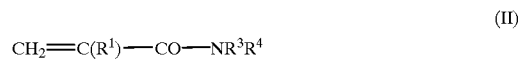

(II)

where $R^1$=H or $CH_3$ and
where $R^3$ and $R^4$ may be identical to or different from one another and are H, $CH_2OH$, $C_nH_{2n+1}$ where n=1 to 30 or $CH_2OR^5$ where $R^5=C_mH_{2m+1}$ where m=1 to 12, and b) at least one copolymerizable, ethylenically unsaturated organic compound of the general formula (A)

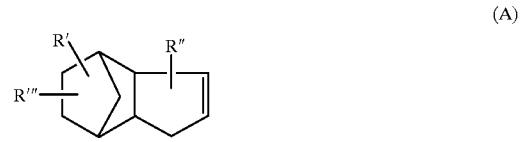

(A)

where R' and R" can be identical to or different from one another and are H, $C_pH_{2p+1}$ where p=1 to 6, cycloalkyl, aryl or aralkyl and R''' is acryloyl, methacryloyl, ethacryloyl or cinnamoyl, it being possible for this compound to be replaced in part by one or more other copolymerizable, ethylenically unsaturated organic compounds which are different from (a).

20 Claims, No Drawings

COATING ARTICLES USING RADIATION-CURABLE POWDER COATINGS

This is a National Stage of PCT/EP 96/05864, filed Dec. 30, 1996.

The present invention relates to a method of coating articles with powder coatings which contain polymers and which are applied to the surface of the substrate to be coated, are melted and are crosslinked by UV radiation.

The term radiation-curable powder coatings generally refers to finely particulate, organic polymer powders which do not stick together during storage (ie. are blocking-resistant), are in general electrostatically chargeable, and which can be applied by spraying to substrates in an electric field or applied to the substrate to be coated by other methods, eg. by fluidized-bed sintering. On the substrates the powders are melted by heating to convert them into even coatings which are then crosslinked by a photochemically initiated reaction.

The powder coatings in use include both partially crosslinked coating materials and those which can be melted while exhibiting purely thermoplastic behavior. For applications requiring high degrees of weather resistance, scratch resistance, corrosion prevention, elasticity and gloss retention, for example in automotive finishing, only crosslinked systems are suitable; purely thermoplastic sintered powders are unable to satisfy these requirements. Crosslinking of the powder coatings currently employed is almost exclusively by thermally initiated reactions of the polymeric film-forming binders with themselves or with an added crosslinking agent. Examples of such thermally activated crosslinking reactions are the reaction of copolymerized epoxide groups with solid dicarboxylic acid anhydrides such as phthalic anhydride (cf. eg. U.S. Pat. No. 3,919,347) or of copolymerized hydroxyl groups with blocked isocyanates.

A major problem with powder coatings is their poor flow in comparison to liquid systems. This poorer comes about since it is not possible with thermally activated systems to make a clean division between the melting process and the crosslinking reaction; a crosslinking reaction resulting in an increase in viscosity occurs even during melting, so that the low viscosity which is desirable for optimum flow is not achieved or, if achieved, is not maintained for a sufficient period. This problem cannot be solved by the use of polymers having a low melting point, since powder coatings produced from such polymers stick together during storage, ie. they do not have an adequate blocking resistance.

There have therefore been attempts to separate the melting process from the crosslinking reaction, by using a reaction which is not thermally activated for the crosslinking process. For this purpose, binders having mainly acrylic double bonds have been proposed in combination with photoinitiators. The intention is first to melt these mixtures at a sufficiently high temperature and then to carry out crosslinking with UV light.

However, this method is also unable to separate the thermal crosslinking from the melting process to a sufficient extent, since the acrylic double bonds too are able to undergo thermal polymerization. Further problems result from the possibility of thermally initiated polymerization of the double bonds during preparation of the powders, for which it is generally necessary to employ melt processes, ie. relatively high temperatures.

EP-A-346 734, EP-A-367 054, EP-A-377 199, EP-A-395 990, EP-A-417 564, EP-A-448 741, EP-A-458 164 and EP-A-486 897 disclose specific aromatic ketones which can be used for the preparation of UV-crosslinking adhesives, especially contact adhesives. These documents do not disclose the transfer of this principle to the separation of the melting and crosslinking process with regard to powder coatings.

DE-A-24 36 186 describes the preparation of UV-crosslinkable powder coatings from polymers containing from 0.5 to 3.5 polymerizable C—C double bonds per 1000 molecular weight units. These polymers are converted to powder, mixed if desired with from 0.1% to 0.5% of photoinitiators, applied to the substrate to be coated, melted, and then crosslinked by the action of ionizing or UV radiation. However, this document does not mention hydrogen abstraction as a crosslinking principle.

U.S. Pat. No. 3,926,639 relates to polymeric compounds, derived from benzophenonecarboxylic acids, as substances having built-in photoinitiators. If double bonds are present these compounds are autophotopolymerizable or else can be employed as polymeric photoinitiators, for example with substances containing acrylic unsaturation, such as pentaerythritol triacrylate. However, this document does not disclose hydrogen abstraction as a crosslinking principle, nor does it mention powder coatings.

U.S. Pat. No. 4,129,488 and U.S. Pat. No. 4,163,810 relate to UV-crosslinkable powder coatings which are based on ethylenically unsaturated polymers and which may contain photoinitiators, which may even be chemically bonded to the polymers, the polymers having a specific block composition. These documents too contain no mention of hydrogen abstraction as a crosslinking principle for coating materials which are essentially free from double bonds.

EP-A-286 549 describes photostructured circuit boards which are produced in a special process using known UV-crosslinkable coating materials. Two classes of UV-crosslinkable polymers are mentioned: epoxy resins, which are polymerized cationically using UV-activatable initiators, and polymers containing ethylenic, preferably acrylic, unsaturation, which are polymerized using the UV initiators known for such systems. This document again contains no mention either of hydrogen abstraction as a crosslinking principle or of powder coatings whose crosslinking is based on this principle.

EP-A-0 237 312 describes ethylenically unsaturated compositions for the production of radiation-crosslinkable circuit boards, these compositions including fractions with dicyclopentadienyl-like structures in order to improve the adhesion. In this case crosslinking is effected by way of the double bonds; however, hydrogen abstraction as a crosslinking principle is not mentioned here.

None of the documents set out above mentions compounds of the general formula (A) and (B) according to the present invention.

The publications GB-A-2 010 248, DE-A-25 41 641, DE-A-26 35 122, DE-A-26 35 123, DE-A-26 41 662, DE-A-27 57 375 and DE-A-27 57 420 relate to radiation-curable binders for printing inks in which cyclopentadiene resins are an ingredient; the capacity for radiation crosslinking, however, is brought about in all cases by the introduction of free-radically polymerizable double bonds, generally acrylic double bonds. There is no mention of systems which can be crosslinked by hydrogen abstraction but which contain no readily polymerizable double bonds, the term readily polymerizable double bonds referring for the purposes of the present invention to, for example, (meth)acrylic, vinyl or allyl groups. There is likewise no mention of powder coatings in these documents.

It is an object of the present invention to solve the above-mentioned problems of the known UV-curing powder coatings.

We have found that this object is achieved by the application of a crosslinking principle which cannot be activated thermally, since it contains no readily polymerizable double bonds, and which is based on the known hydrogen-abstracting action of photochemically excited phenone derivatives and other structures capable of hydrogen abstraction.

The use of this principle in the context of UV-crosslinkable powder coatings, for the strict separation of the melting process from the crosslinkable reaction, leads to surprising technical advantages.

The present invention provides a method of coating articles with powder coatings which contain polymers, are applied to the surface of the substrate to be coated, are melted and are crosslinked by UV irradiation, wherein the polymers employed are copolymers of (a) at least one monomer of the general formula (I)

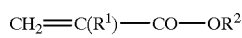
(I)

where $R^1$=H or $CH_3$ and
$R^2$=H, $C_nH_{2n+1}$ where n=from 1 to 30, or is an alicyclic, araliphatic or heterocyclic radical, hydroxyalkyl, alkoxyalkyl, glycidyl or aminoalkyl,
or of the general formula (II)

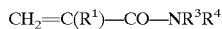
(II)

where $R^1$=H or $CH_3$ and
where $R^3$ and $R^4$ may be identical to or different from one another and are H, $CH_2OH$, $C_nH_{2n+1}$ where n=1 to 30 or $CH_2OR^5$ where $R^5$=$C_mH_{2m+1}$ where m=1 to 12,
and (b) at least one copolymerizable, ethylenically unsaturated organic compound of the general formula (A)

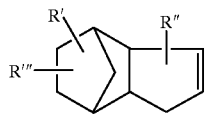
(A)

where R' and R" can be identical to or different from one another and are H, $C_pH_{2p+1}$ where p=1 to 6, cycloalkyl, aryl or aralkyl and R'" is acryloyl, methacryloyl, ethacryloyl or cinnamoyl, it being possible for this compound to be replaced in part by one or more other copolymerizable, ethylenically unsaturated organic compounds which are different from (a),
and wherein a photoinitiator or photoinitiator system is additionally present in the powder coating.

In one embodiment of the novel method the copolymers employed are those whose copolymerized units include not only components (a) and (b) but also a component (c), namely c) at least one copolymerizable, ethylenically unsaturated, aromatic or partially aromatic ketone which in the excited triplet state is capable of abstracting hydrogen.

In this case, the addition of a photoinitiator or photoinitiator system is generally unnecessary.

Preferred copolymers are those whose copolymerized units include, as component (b), organic compounds of the general formula (A), especially dihydrodicyclopentadienyl acrylate, dihydrodicyclopentadienyl methacrylate, dihydrodicyclopentadienyl ethacrylate or dihydrodicyclopentadienyl cinnamate.

Also preferred are copolymers with glass transition temperatures of from 20 to 140° C., especially those in which at least some of the copolymerized units include, as component (a), a compound from the group consisting of isobornyl acrylate, isobornyl methacrylate, isobornyl ethacrylate, isobornyl cinnamate, adamantane acrylate, adamantane methacrylate, adamantane ethacrylate and adamantane cinnamate.

The novel method especially prefers copolymers wherein component (a), incorporated by polymerization, comprises alkyl acrylate or alkyl methacrylate having 1–10 carbon atoms in the alkyl radical, or mixtures thereof with glycidyl (meth)acrylate and/or (meth)acrylic acid, and also those where component (b), likewise incorporated by polymerization, comprises not only compounds of the general formula (A) but also styrene, 4-tert-butylstyrene and/or 1-methylstyrene.

Component (c) is preferably incorporated by polymerization in a quantity of from 10 to 50% by weight, based on the total quantity of components (a), (b) and (c). Preferred embodiments of the novel method include that in which the copolymers have been prepared by the method of high-temperature polymerization in bulk, with or without free-radical polymerization initiators, or in the presence of solvents with removal of the solvent by customary methods.

A further embodiment of the novel method is that wherein the copolymers are polymerized in solution and the coating powders are prepared from the solutions by spray drying, following the addition if desired of pigments and auxiliaries.

A preferred embodiment of the novel method is that wherein component (c) of the copolymers employed, comprises, incorporated by polymerization, at least one copolymerizable, ethylenically unsaturated acetophenone derivative and/or benzophenone derivative which in the excited triplet state is capable of abstracting hydrogen and which has no phenyl group with a free hydroxyl in the ortho-position to the carbonyl group of the phenone patent structure.

The powder coatings to be employed in accordance with the invention can be applied to the surface of the substrate to be coated by electrostatic spraying by fluidized-bed sintering or by another method which is conventional for the processing of powder coatings, and once applied they can be melted by heating and, after having formed a coating which has flowed out evenly but is still liquid, can be crosslinked by UV radiation.

UV irradiation can also be carried out after partial or complete cooling of the previously melted coatings.

Before being processed further to give powder coatings, the copolymers can also be mixed with solid, ethylenically unsaturated, monomeric, oligomeric or polymeric substances in a ratio of from 90:10 to 10:90.

The copolymers may also contain double bonds or may, in addition to the intrinsic UV photoinitiators of component (c) incorporated by polymerization, contain other customary UV photoinitiators and, if desired, customary UV stabilizers.

Further details of the structural components of the copolymers to be employed in the novel method are given below.

The copolymers to be used in accordance with the invention contain, incorporated by polymerization, as component a) at least one monomer of the general formula (I)

$$CH_2=C(R^1)-CO-OR^2 \quad (I)$$

where $R^1$=H or $CH_3$ and
$R^2$=H, $C_nH_{2n+1}$ where n=from 1 to 30, an alicyclic, aromatic, araliphatic or heterocyclic radical, hydroxyalkyl, eg. $C_1$–$C_4$-hydroxyalkyl, alkoxyalkyl, eg. $C_1$–$C_4$-alkoxy-$C_1$–$C_4$-alkyl, glycidyl or aminoalkyl, for example with 1 to 4 carbon atoms, or of the general formula (II)

$$CH_2=C(R^1)-CO-NR^3R^4 \quad (II)$$

where $R^1$=H or $CH_3$ and
where $R^3$ and $R^4$ may be identical to or different from one another and are H, $CH_2OH$, $C_nH_{2n+1}$ where n=1 to 30 or $CH_2OR^5$ where $R^5$=$C_mH_{2m+1}$ where m=1 to 12.

Examples of suitable components (a) are the esters of acrylic acid and methacrylic acid with aliphatic, cycloaliphatic, araliphatic and aromatic alcohols having 1 to 30, preferably 1 to 20, carbon atoms, for example methyl (meth)acrylate, ethyl (meth)acrylate, propyl (meth)acrylate, isopropyl (meth)acrylate, n-butyl (meth)acrylate, isobutyl (meth)acrylate) tert-butyl (meth)acrylate, amyl (meth) acrylate, isomyl (meth)acrylate, hexyl (meth)acrylate, 2-ethylhexyl (meth)acrylate, decyl (meth)acrylate, undecyl (meth)acrylate, dodecyl (meth)acrylate, tridecyl (meth) acrylate, cyclohexyl (meth)acrylate, methylcyclohexyl (meth)acrylate, benzyl (meth)acrylate, phenoxyalkyl (meth) acrylate, tetrahydrofurfuryl (meth)acrylate and furfuryl (meth)acrylate and the esters of 3-phenylacrylic acid and the various isomeric forms thereof, for example methyl cinnamate, ethyl cinnamate, butyl cinnamate, benzyl cinnamate, cyclohexyl cinnamate, isoamyl cinnamate, tetrahydrofurfuryl cinnamate, furfuryl cinnamate, acrylic acid, methacrylic acid, 3-phenylacrylic acid, hydroxyalkyl (meth) acrylates such as ethylglycol mono(meth)acrylate, butylglycol mono(meth)acrylate, hexanediol mono(meth)acrylate, glycol ether (meth)acrylates, such as methoxyethylglycol mono(meth)acrylate, ethyloxyethylglycol mono(meth) acrylate, butyloxyethylglycol mono(meth)acrylate, phenyloxyethylglycol mono(meth)acrylate, glycidyl acrylate, glycidyl methacrylate and also amino (meth)acrylates, such as 2-aminoethyl (meth)acrylate. Examples of suitable compounds of the general formula (II) are (meth)acryla nides, such as acrylamide, methacrylamide, methylolacrylamide and methylolmethacrylamide.

A further improvement in photosensitivity is achieved by additionally using isobornyl acrylate, isobornyl methacrylate, isobornyl ethacrylate, isobornyl cinnamate, adamantane acrylate, adamantane methacrylate, adamantane ethacrylate and adamantane cinnamate, in the various isomeric forms, in the monomers (a).

Monomers (a) which carry other functional groups apart from the double bond may be used for an additional, thermally activatable crosslinking reaction, and in this case are present in proportions of 10 to 40% of the monomers (a). Generally, however, they are employed in minor amounts in which they improve, for example, the adhesion, the electrostatic chargeability, the flow properties of the powders and the surface evenness. Furthermore, derivatives of 3-phenylacrylic acid as intrinsic stabilizers improve the weather resistance of the coatings.

Component (a) is incorporated by polymerization in the copolymer to be employed in accordance with the invention, in general, in quantities of from 20 to 80% by weight, preferably from 40 to 60% by weight, based on the total quantity of components (a)+(b)+(c).

Component (b) comprises, according to the invention, copolymerizable, ethylenically unsaturated organic compounds of the general formula (A)

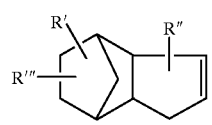

(A)

where R' and R" can be identical to or different from one another and are H, $C_pH_{2p+1}$ where p=1 to 6, cycloalkyl, for example with 5 to 6 carbon atoms, aryl, for example phenyl or aralkyl, for example with 7 to 9 carbon atoms, and R'" is acryloyl, methacryloyl, ethacryloyl or cinnamoyl, or else is a radical derived from maleic acid, fumaric acid or crotonic acid, it being possible for these compounds to be replaced in part by one or more copolymerizable, ethylenically unsaturated organic compounds which are different from (a).

Examples of compounds of the general formula (A) are:

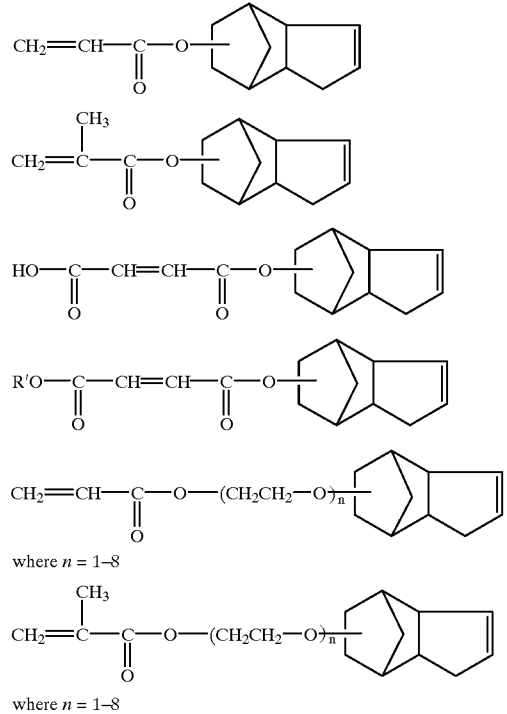

where n = 1–8

By additionally using compounds of the general formula (A) there is, surprisingly, a quite extraordinary increase in the photosensitivity of the coatings.

Also suitable as component (b) are dihydrodicyclopentadienyl ethacrylate and dihydrodicyclopentadienyl cinnamate. Likewise of importance is the adduct, which can be copolymerized along with acrylic esters, of dicyclopentadiene, maleic anhydride and water, and the esters of this adduct with mono- or polyfunctional alcohols.

Examples of other monomers suitable as component (b), which can be used additionally if desired and are different from component (a), are those which can be polymerized by free-radical, especially those which are able to undergo free-radical copolymerization with component (a), such as styrene, 1-methylstyrene, 4-tert-butylstyrene, 2-chlorostyrene, vinyl esters of fatty acids having 2 to 20 carbon atoms, such as vinyl acetate, vinyl propionate, vinyl ethers of alkanols having 2 to 20 carbon atoms, such as vinyl isobutyl ether, and also vinyl chloride, vinylidene chloride, vinyl alkyl ketones, dienes such as butadiene and isoprene, and esters of maleic and crotonic acid. Other suitable monomers (b), whose additional use is optional, are cyclic vinyl compounds such as vinylpyridine, 2-methyl-1-vinylimidazole, 1-vinylimidazole, 5-vinylpyrrolidone and N-vinylpyrrolidone. Monomers containing allylic unsaturation can also be employed, such as allyl alcohol, allyl alkyl ethers, monoallyl phthalate and diallyl phthalate. Other suitable monomers are acrolein, methacrolein and polymerizable isocyanates.

Component (b) is incorporated by polymerization in the copolymer to be employed in accordance with the invention, in general, in quantities of from 5 to 80% by weight, preferably from 20 to 40% by weight, based on the overall quantity of components (a)+(b)+(c).

Particular importance is attached to components (monomers) (a) or else (b) which carry hydrogen atoms which can be abstracted with particular ease, lo especially monomers containing the following groups: $C_3$–$C_{12}$-isoalkyl, such as isopropyl, isobutyl or ethylhexyl, $C_3$–$C_{12}$-aminoisoalkyl, such as diisopropylaminoethyl, N-isobutylisopropylaminoalkyl, $C_5$–$C_8$-cycloisoalkyl, such as methylcyclohexyl, isopropylcyclohexyl, cycloalkyl, furfuryl and tetrahydrofurfuryl, and also p-menthyl, terpine and thymol groups or groups of the following formulae

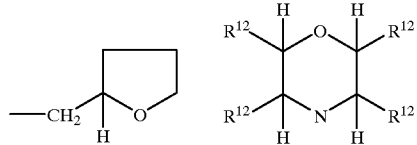

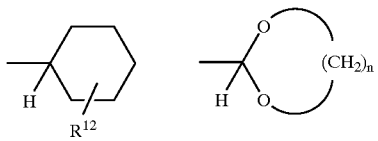

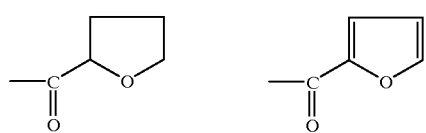

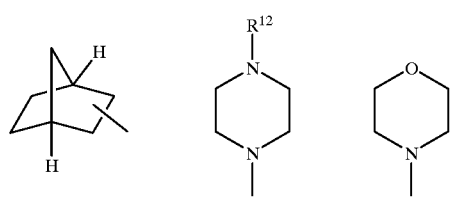

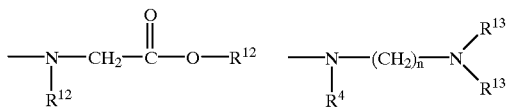

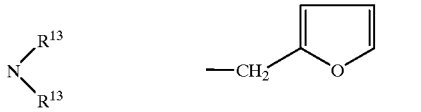

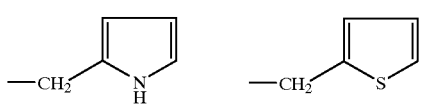

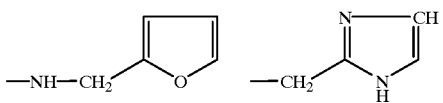

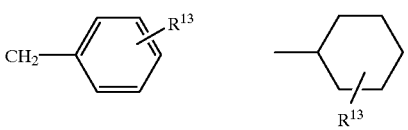

where n=2 or 3 and $R^{12}$=H, straight-chain $C_1$–$C_5$-alkyl, branched $C_1$–$C_{15}$-alkyl, straight-chain or branched alkyl substituted by halogen (such as Cl, F, Br), such as —C—(CF$_3$) or isopropyl, $R^{13}$=$C_1$–$C_{15}$-alkyl, such as isopropyl, isobutyl or isoamyl, aryl, such as isoamylphenyl, $C_1$–$C_{15}$-alkyl substituted by halogen, such as F, Cl or Br, or aryl substituted by halogen, such as F, Cl or Br.

Such monomers can likewise be used to increase the photosensitivity of the coating materials, to be prepared according to the invention.

Component (c) comprises copolymerizable, ethylenically unsaturated, aromatic or partially aromatic ketones which in the excited triplet state are capable of abstracting hydrogen before and/or after the polymerization. Particularly useful substances are those having the following structural formulae:

(III)
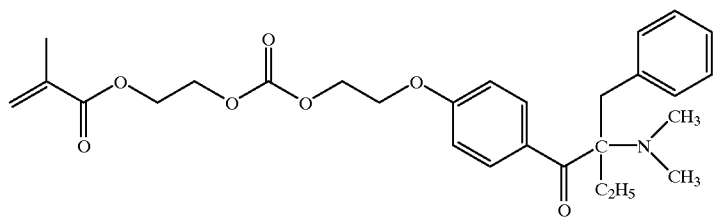
(IV)
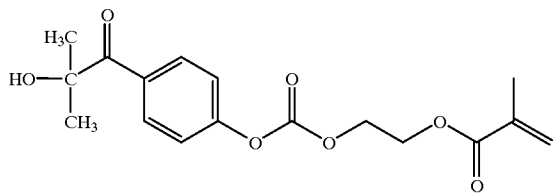
(V)
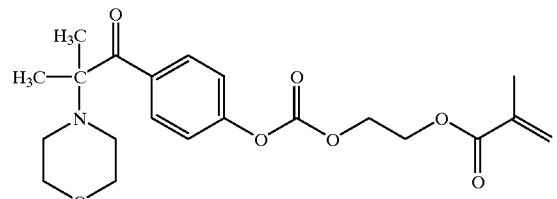
(VI)
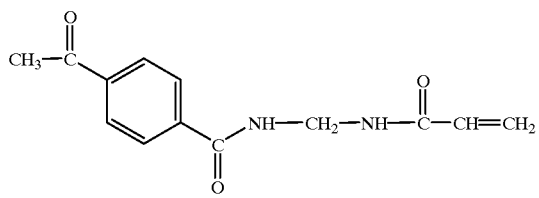
(VII)
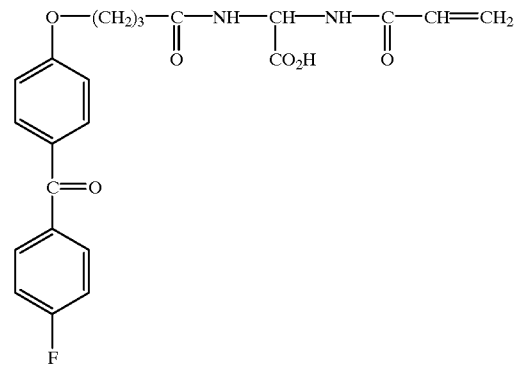
(VIII)
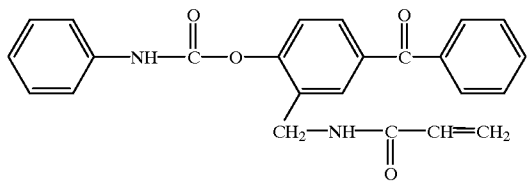
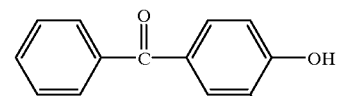
(IX) (X)
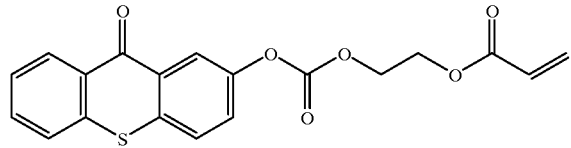

-continued
(XII)
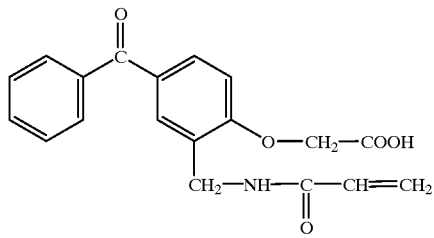
(XIII)
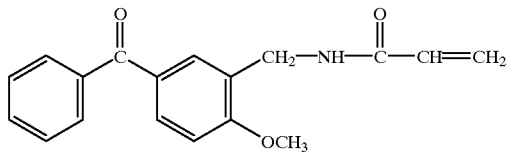
(XIV)
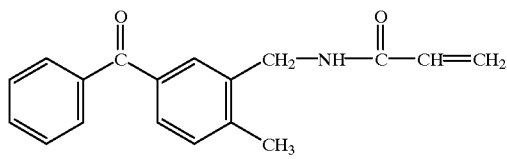
(XV)
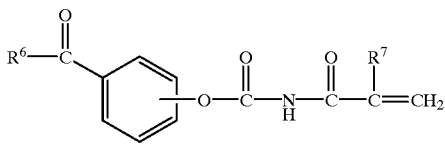
where
R$^6$ is —CH$_3$ or —C$_6$H$_5$ and
R$^7$ is —H or —CH$_3$
(XVI)
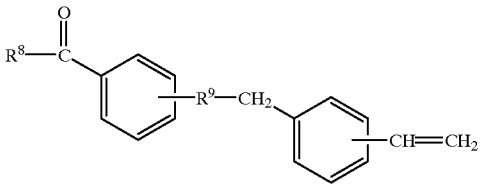
where
R$^8$ is —C$_n$H$_{2n+1}$ where $n$ = 1 to 3 or —C$_6$H$_5$
R$^9$ is —O— , $-\overset{\overset{O}{\|}}{C}-O-$ , $-\overset{R^{10}}{\underset{}{N}}-$ or $-\overset{\oplus}{N}(P^{11})_2-$
R$^{10}$ is —H or —C$_n$H$_{2n+1}$ where $n$ = 1 to 8,
R$^{11}$ is —C$_n$H$_{2n+1}$ where $n$ = 1 to 4,
(XVII)
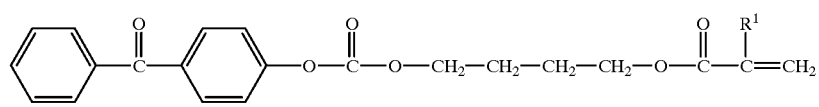
(XVIII)
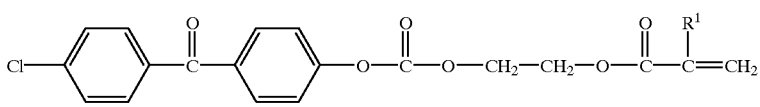
(XIX)
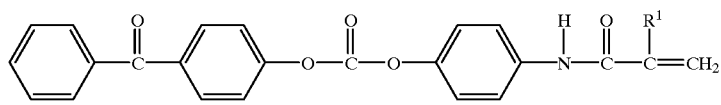
(XX)
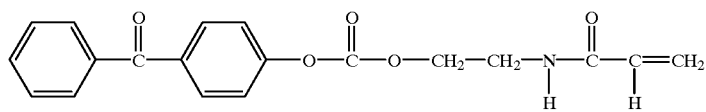
(XXI)
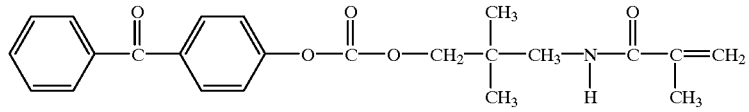

-continued
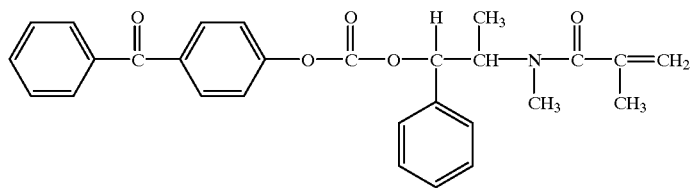 (XXII)
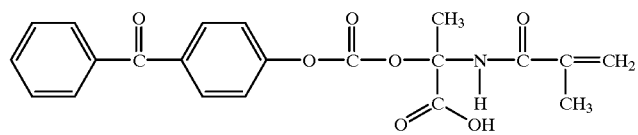 (XXIII)
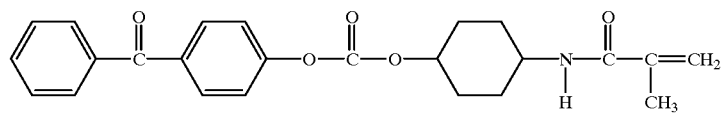 (XXIV)
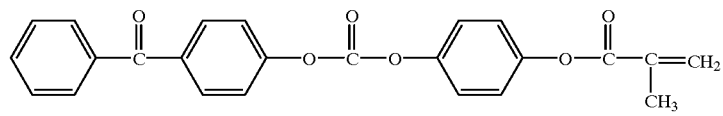 (XXV)
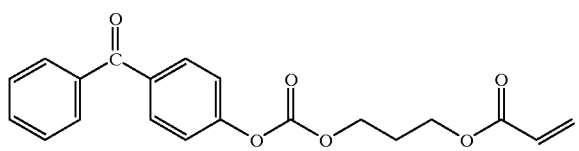 (XXVII)
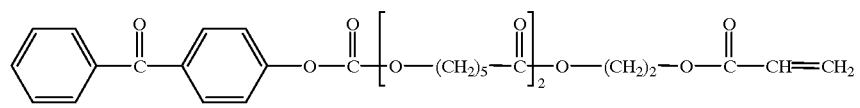 (XXVI)
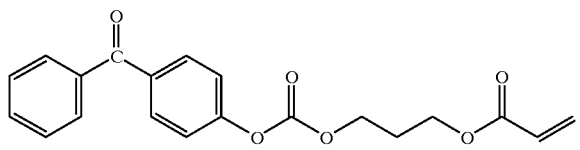 (XXVII)
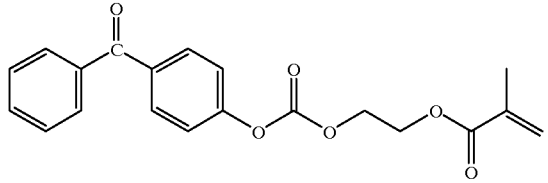 (XXVIII)
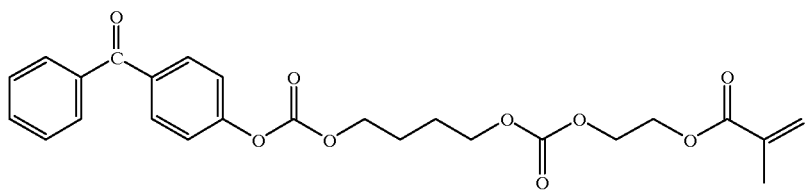 (XXIX)

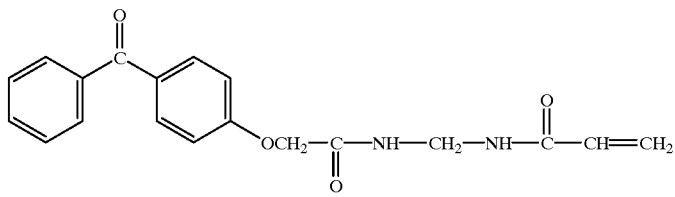
(XXX)
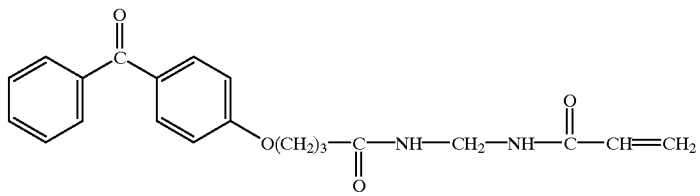
(XXXI)
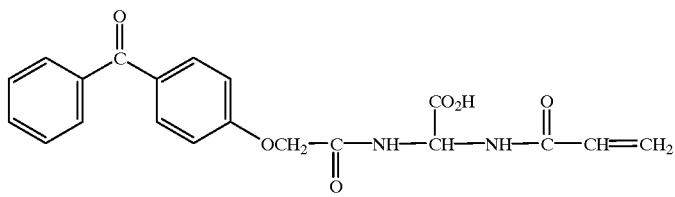
(XXXII)
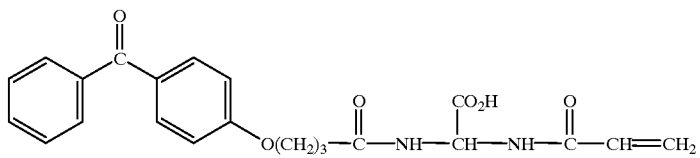
(XXXIII)
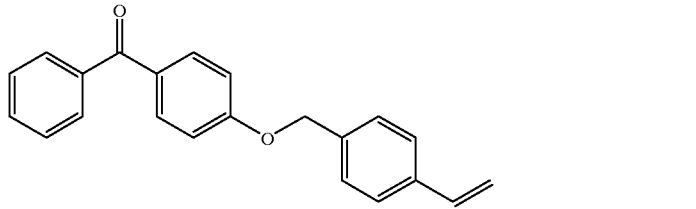
(XXXIV)
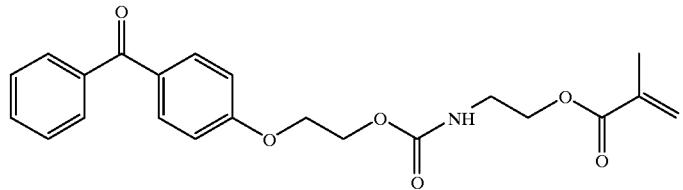
(XXXV)
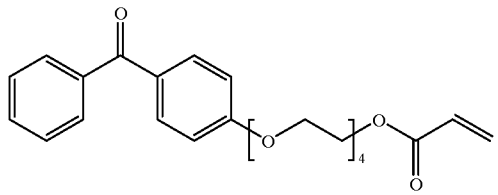
(XXXVI)
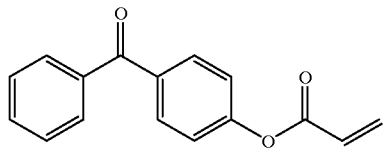
(XXXVII)

-continued

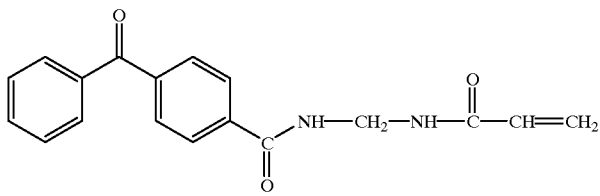
(XXXVIII)

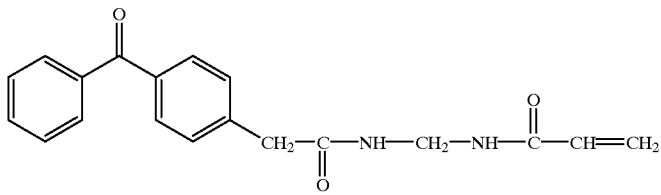
(XXXIX)

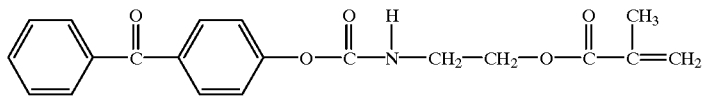
(XL)

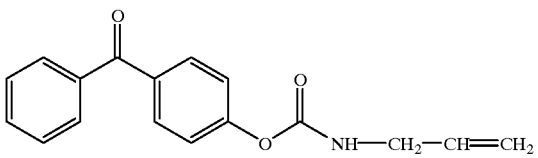
(XLI)

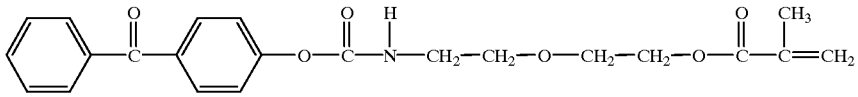
(XLII)

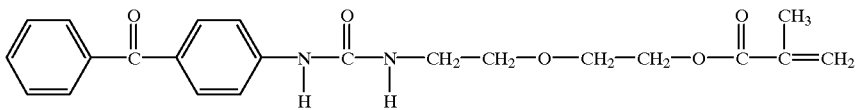
(XLIII)

Preferred components (c) are those derived from benzophenone, especially those in which the ethylenically unsaturated group is separated from the benzophenone group by molecular spacer, ie. in the form ketone group . . . spacer . . . ethylenically unsaturated group.

Examples of such particularly preferred components (c) are those indicated by the above structural formulae (VIII), (XVII), (XX), (XXI), (XXII), (XXIII), (XXIV), (XXV), (XXVI), (XXVII), (XXVIII), (XXXIX), (XL), (XLII) and (XLIII).

Component (c) can be incorporated by polymerization into the copolymer to be used in accordance with the invention in quantities of from 5 to 80% by weight, preferably from 10 to 30% by weight, based on the overall quantity of components (a)+(b)+(c).

The selection of the monomers (a) to c) to be combined is advantageously such that the powder coatings have good stability during storage, ie. are especially blocking-resistant and remain capable of application, ie. retain good electrostatic spraying properties, and the coatings cured by UV light meet the requirements placed on them. These requirements may be very different; for instance, clear topcoats or metallic automotive finishes are required to have a very high degree of yellowing resistance and weather resistance, scratch resistance and gloss retention coupled with a high degree of hardness. For a coil coating material, ie. one which is applied to sheet-metal webs which are then coiled and later on subjected to a deformation process, the critical factors are maximum elasticity and adhesion. The price of the monomers may be another selection criterion for specific applications in which a low price is a higher priority than the quality of the coatings.

It is known, for example, that styrene and methylmethacrylate are hard monomers which increase the glass transition temperature and raise the softening point of the polymers and the hardness of the coatings, whereas butyl acrylate, ethylhexyl acrylate and tridecyl acrylate are soft monomers which lessen these properties but bring about an improvement in elasticity. It is also known that minor proportions of (meth)acrylic acid or (meth)-acrylamide improve adhesion.

These basic principles governing the selection and mixing of monomers in order to establish the basic properties of coating materials are known to polymer chemists and coatings technologists.

Since the proportion of components (b) of the general formula (A) has a direct effect on the crosslinking density, it is advantageous to carry out experiments in order to determine the optimum proportion which is appropriate to the intended application.

Further constituents of the monomer mixtures may serve to utilize the UV crosslinking of double bonds as a further crosslinking reaction in addition to crosslinking by hydrogen abstraction by way of monomers (c). The double bonds necessary for this purpose can be introduced into the polymers by, for example, reacting copolymerized (meth)acrylic acid with glycidyl methacrylate or copolymerized glycidyl methacrylate with (meth)acrylic acid, or, preferably, reacting copolymerized hydroxyalkyl (meth)acrylates with acrylic anhydride or methacrylic anhydride.

In addition to the copolymerized, intrinsic UV photoinitiators of component (c) capable of H abstraction, the copolymers may also include other, customary UV photoinitiators and, if desired, customary UV stabilizers.

The polymers can be prepared conventionally be free-radical solution or bulk polymerization, initiated thermally and/or by free-radical initiators; the addition of regulators for controlling the molecular weight of the polymers is a further possibility.

A preferred embodiment of the novel method comprises preparing the copolymers, with or without free-radical polymerization initiators, by the method of high-temperature polymerization, under superatmospheric pressure, in bulk or in the presence of solvents.

When polymerization is carried out in a solvent the latter is subsequently removed by customary methods.

A particularly suitable process is that of high-temperature bulk polymerization in continuous reactors, since it does away with the need to remove a auxiliary solvent. It is also possible to produce ready-t-use powder coatings in a single process, by incorporating auxiliaries, pigments and other substances into the ready-to-use powder coating formulations in the discharge apparatus of the reactor or in an extruder attached immediately downstream of this reactor.

A particularly advantageous method of preparing the powder coatings is first of all to prepare the polymers in solution and, if desired, to add pigments, further initiators, leveling assistants and other auxiliaries to the solutions, and then to remove the solvent by the spray drying technique.

The polymerization techniques and the production of powder coatings from the polymers is not a subject of the present invention.

For optimum film formation from the powders at relatively low temperatures it is desirable to use polymers having a relatively low molecular weight and a narrow molecular weight distribution.

Highly suitable polymers from the point of view of an optimum film surface are those having a number-average molecular weight $\overline{M}_n$ of from 1000 to 20,000, preferably from 1500 to 8000, in particular from 2000 to 6000.

A further factor is the molecular weight distribution, ie. the quotient of the number-average ($\overline{M}_n$) and the weight-average ($\overline{M}_g$) molecular weight, which for optimum flow should be below 4.

It is possible to deviate from the guide values indicated above in order to meet specific performance requirements, for example high stability on vertical surfaces.

Powder coatings can be produced from the novel polymers by prior art methods as described in, for example, "Powder Coatings, Chemistry and Technology", Tosko Aleksandar Misev, John Wiley and Sons, Chichester (1991) (especially pp. 224–227).

Further additives to the monomer mixtures of components (a)+(b)+(c) can serve to utilize the UV crosslinking of double bonds as co-crosslinking in addition to crosslinking by hydrogen abstraction by way of the monomers (c). The double bonds necessary for this purpose can, as already mentioned above, be introduced into the polymers by, for example, reacting copolymerized (meth)acrylic acid with glycidyl methacrylate or copolymerized glycidyl methacrylate with (meth)acrylic acid.

Components of the monomer mixtures may also be present in order to enable thermally initiated co-crosslinking as a complement to crosslinking by UV light. Examples of suitable components in this context are glycidyl methacrylate, which may react with external crosslinking agents such as polyfunctional carboxylic acids or carboxylic acid anhydrides, or free carboxylic groups derived from copolymerized (meth)acrylic acid, which can be crosslinked using polyepoxy resins. The copolymerization of methylolation products and methylol ethers of (meth)acrylamide is also suitable for achieving thermal co-crosslinking.

In addition, crosslinking may also involve a known mechanism which is not novel and is independent of the mechanism of direct hydrogen abstraction in accordance with the invention. These suitable, known mechanisms include both photoactivated and thermally activated mechanisms. The purpose of this is to produce penetrating networks which give rise to improved coatings properties. For example, resins which carry double bonds and are not part of the invention can be added to the novel copolymers in order to achieve co-crosslinking by way of double bonds. Such resins can be obtained, for example, according to U.S. Pat. No. 4,064,161 or DE-A-24 36 186, based on polymers which contain glycidyl methacrylate and are reacted with acrylic acid. Furthermore, coating materials which are not part of the invention, carrying copolymerized epoxide groups and having the capacity to be crosslinked with polycarboxylic acids, can be added to the novel coating materials.

In general the crosslinking action of component (c) is sufficient for good crosslinking under UV light. The molecular structure of these substances means they are capable of absorbing UV light, making the transition to a state in which their triplets are excited, and bringing about crosslinking by hydrogen abstraction. However, in order to optimize the UV crosslinking and to adapt the formulations to the spectrum of the available UV source, it is possible to use conventional UV absorbers and photoinitiators, such as benzoin ethers, benzophenone compounds, benzoin-phosphine oxides and thioxanthones.

The powder coatings may also contain conventional, prior art auxiliaries, examples being catalysts for co-crosslinking, flow improvers, anticrater agents, adhesion promoters, etc.

In the examples parts and percentages are by weight unless specified otherwise.

The experiments were carried out in an area UV-free illumination.

EXAMPLE 1

400 g of isobutanol were placed in a 2 liter flask fitted with inlet funnel, thermometer, reflux condenser and stirrer, which was flushed with a gentle stream of nitrogen, and were heated to reflux, after which stirring at about 105–108° C. was accompanied by the addition, at a constant rate over the course of one hour, of a mixture of 270 g of methyl methacrylate 300 g of dihydrodicyclopentadienyl acrylate 200 g of styrene 50 g of 2-ethylhexyl acrylate 30 g of acrylic acid 150 g of the compound of the structural formula (XVII) with $R^1$=H and 30 g of tert-butyl peroctoate.

20 minutes after the end of the addition a further 10 g of tert-butyl peroctoate were added dropwise over the course of 15 minutes, after which polymerization was continued at 105–108° C. for 3 hours before the batch was cooled.

The majority of the solvent was removed by distillation under gentle vacuum from the viscous resin solution formed. The resulting resin melt, which contained residual solvent, was then poured out into porcelain dishes lined with aluminum foil, and dried in a vacuum drying cabinet at 80° C. for 48 hours.

The result was a hard, brittle resin, most of which was removed from the foils by tapping them and was ground in a laboratory mill whose grinding mechanism comprised cutting blades. The course fractions were removed using a screen with a mesh size of 100 μm.

K value (DIN 53726): 15.7 (1% strength solution in ethyl acetate)

EXAMPLE 2

The procedure of Example 1 was repeated but with the following altered monomer composition in the feed stream:

300 g of dihydrodicyclopentadienyl acrylate 150 g of isobornyl methacrylate 150 g of styrene 50 g of 2-ethylhexyl acrylate 30 g of acrylic acid 150 g of the compound of the structural formula (XVII) with $R^1$=H.

EXAMPLE 3

The procedure of Example 1 was repeated but with the following altered monomer composition in the feed stream:

170 g of methyl methacrylate 300 g of dihydrodicyclopentadienyl acrylate 150 g of isobornyl acrylate 150 g of styrene 50 g of 2-ethylhexyl acrylate 30 g of acrylic acid 150 g of the compound of the structural formula (XVII) with $R^1$=H.

EXAMPLE 4

The procedure of Example 1 was repeated but with the following altered monomer composition in the feed stream:

400 g of methyl methacrylate 300 g of dihydrodicyclopentadienyl acrylate 200 g of styrene 20 g of butyl acrylate 50 g of 2-ethylhexyl acrylate 30 g of acrylic acid After the end of polymerization, 50 g of benzophenone were added in the course of cooling and were dissolved with stirring in the polymer solution. Subsequent working up to form a powder was as in Example 1.

EXAMPLE 5

The procedure of Example 1 was repeated but with the following altered monomer composition in the feed stream:

250 g of methyl methacrylate 300 g of dihydrodicyclopentadienyl acrylate 150 g of isobornyl methacrylate 200 g of styrene 50 g of 2-ethylhexyl acrylate 30 g of acrylic acid After the end of polymerization, 50 g of benzophenone were added in the course of cooling and were dissolved with stirring in the polymer solution. Subsequent working up to form a powder was as in Example 1.

COMPARISON EXAMPLE V1

The procedure of Example 1 was repeated but with the following, altered monomer composition in the feed stream:

470 g of methyl methacrylate 200 g of styrene 150 g of 2-ethylhexyl acrylate 50 g of acrylic acid 150 g of the compound of the structural formula (XVII) with $R^1$=H.

Thus no dihydrodicyclopentadienyl acrylate was used. The proportions of methyl methacrylate and ethylhexyl acrylate were raised. By means of this mixture the hardness ($T_g$, measured by DSC) of the copolymer was adapted to that of the copolymers of the other examples in order to improve the comparability, although the hardness is not essential to the novel improvement in photosensitivity.

COMPARISON EXAMPLE V2

The procedure of Example 1 was repeated but with the following, altered monomer composition in the feed stream:

270 g of methyl methacrylate 300 g of isobornyl methacrylate 200 g of styrene 50 g of 2-ethylhexyl acrylate 30 g of acrylic acid 150 g of the compound of the structural formula (XVII) with $R^1$=H.

COMPARISON EXAMPLE V3

The procedure of Example 1 was repeated but with the following, altered monomer composition in the feed stream:

270 g of methyl methacrylate 200 g of styrene 300 g of isobornyl acrylate 50 g of 2-ethylhexyl acrylate 30 g of acrylic acid 150 g of the compound of the structural formula (XVII) with $R^1$=H.

Characterization of the Polymers

| Example or Comparison Example | K value (DIN 53726) | $T_G$ (DSC) | m.p. (determined in a capillary tube) |
| --- | --- | --- | --- |
| Ex. 1 | 15.7 | 62 | 104° C. |
| Ex. 2 | 16.8 | 60 | 94° C. |
| Ex. 3 | 17.3 | 58 | 98° C. |

| Example or Comparison Example | K value (DIN 53726) | $T_G$ (DSC) | m.p. (determined in a capillary tube) |
|---|---|---|---|
| Ex. 4 | 19.6 | 63 | 102° C. |
| Ex. 5 | 16.8 | 72 | 101° C. |
| Comp. Ex. V1 | 19.6 | 63 | 89° C. |
| Comp. Ex. V2 | 19.4 | 64 | 92° C. |
| Comp. Ex. V3 | 18.8 | 60 | 97° C. |

Comparison Testing of the Polymers

The powders are soluble in isopropanol and acetone to give clear solutions, ie. are not crosslinked. For testing, the powders are applied to a metal test panel using a doctor blade with a gap width of 200 μm. In this way, a loose, uniform layer of power is obtained on the panel. The panels were then placed on a heating table which had been preheated to 140° C. After 3 minutes the powders had fused to form an even, uniform resin layer. It was possible to stir these melts as viscous liquids using a small spatula.

The heating table was then placed under a metered medium-pressure mercury lamp with broadband UV light. After exposure, the sample plates were removed from the heating table and left to cool. The resulting layers of coating material have a thickness at this point of about 70 μm. After cooling, cotton pads soaked with acetone were placed on the exposed areas and on the previously masked areas of the panels for 5 minutes in order to test the acetone resistance.

In serial experiments the exposure energy (mJ/cm²) was determined at which the resins were no longer attacked by acetone in the exposed area; the maximum exposure energy applied was 10,000 mJ/cm².

| Example or Comparison Example | Exposure energy [mJ/cm²] | Acetone test exposed region | Acetone test unexposed region |
|---|---|---|---|
| Ex. 1 | 1160 | no attack | dissolved |
| Ex. 2 | 860 | no attack | dissolved |
| Ex. 3 | 820 | no attack | dissolved |
| Ex. 4 | 1620 | no attack | dissolved |
| Ex. 5 | 1450 | no attack | dissolved |
| Comp. Ex. V1 | 10,000 | highly swollen | dissolved |
| Comp. Ex. V2 | 10,000 | soft | dissolved |
| Comp. Ex. V3 | 10,000 | soft | dissolved |

Example 1 shows double bond-free crosslinking by way of component (b) in conjunction with a copolymerized benzophenone compound (c) which in the excited triplet state is capable of hydrogen abstraction.

Examples 2 and 3 show the increase in photosensitivity brought about by additionally using substances such as isobornyl meth(acrylate).

Example 4 shows double bond-free crosslinking by way of component (b) in conjunction with an added photoinitiator (benzophenone).

Example 5 shows the increase in photosensitivity in comparison to Example 4 by the additional use of substances such as isobornyl (meth)acrylate.

The comparison examples correspond to the known prior art as taken from the cited European patents. They show that in the absence of component (b) a degree of UV crosslinking good enough for powder coatings is not achieved, even at exposure energy levels which are no longer industrially practicable.

We claim:

1. A method of coating articles with powder coatings which are applied to the surface of the substrate to be coated, and which are then melted and are crosslinked by UV irradiation, wherein the powder coatings employed are copolymers of the following components
    (a) at least one monomer of the general formula (I)

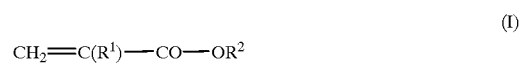

(I)

where $R^1$=H or $CH_3$ and
$R^2$=H, $C_nH_{2n+1}$ where n=from 1 to 30, or
is an alicyclic, araliphatic or heterocyclic radical, hydroxyalkyl, alkoxyalkyl, glycidyl or aminoalkyl, or of the general formula (II)

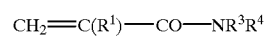

(II)

where $R^1$=H or $CH_3$ and
where $R^3$ and $R^4$ may be identical to or different from one another and are H, $CH_2OH$, $C_nH_{2n+1}$ where n=1 to 30 or $CH_2OR^5$ where $R^5$=$C_mH_{2m+1}$ where m=1 to 12, and
(b) at least one copolymerizable, ethylenically unsaturated organic compound of the general formula (A)

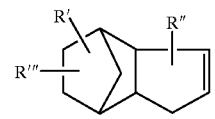

(A)

where R' and R" can be identical to or different from one another and are H, $C_pH_{2p+1}$ where p=1 to 6, cycloalkyl, aryl or aralkyl and R'" is acryloyl, methacryloyl, ethacryloyl or cinnamoyl, or is a radical derived from maleic acid, fumaric acid or crotonic acid, and wherein a photoinitiator or photoinitiator system is present in the powder coating.

2. A method as claimed in claim 1, wherein component (b) comprises at least one compound selected from the group consisting of dihydrodicyclopentadienyl acrylate, dihydrodicyclopentadienyl methacrylate, dihydrodicyclopentadienyl ethacrylate and dihydrodicyclopentadienyl cinnamate.

3. A method as claimed in claim 1, wherein the copolymers have glass transition temperatures of from 20° C. to 140° C.

4. A method as claimed in claim 1, wherein some of the component (b) of the copolymers, incorporated by polymerization, is at least one compound selected from the group consisting of styrene, 4-tert-butylstyrene and 1-methylstyrene.

5. A method as claimed in claim 1, wherein the copolymers are polymerized in solution and the powder coating materials are prepared from the solution by spray drying, optionally following the addition of pigments and auxiliaries.

6. A method as claimed in claim 1, where in the powder coatings are applied to the surfaces of the substrate to be coated and once applied they are melted by heating and, after having formed a coating which has flowed out evenly but is still liquid, are crosslinked by UV irradiation or crosslinked by UV rays after partial or complete cooling.

7. A method as claimed in claim 1, wherein the copolymers, before being processed further to give powder coatings, are mixed with solid, ethylenically unsaturated, monomeric, oligomeric or polymeric substances in a ratio of from 90:10 to 10:90.

8. A method as claimed in claim 6, wherein the powder coating contains one or more UV stabilizers.

9. A method as claimed in claim 7, wherein said solid, ethylenically unsaturated monomeric, oligomeric or polymeric substances contain carbon-carbon double bonds.

10. A method of coating articles with powder coatings which are applied to the surface of the substrate coated, and which are then melted and are crosslinked by UV irradiation, wherein the powder coatings employed are copolymers of the following components (a) at least one monomer of the general formula(I)

where $R^1$=H or $CH_3$ and
$R^2$=H, $C_nH_{2n+1}$ where n=from 1 to 30, or
is an alicyclic, araliphatic or heterocyclic radical, hydroxyalkyl, alkoxyalkyl, glycidyl or aminoalkyl, or of the general formula(II)

where $R^1$=H or $CH_3$ and
where $R^3$ and $R^4$ may be identical to or different from one another and are H, $CH_2OH, C_nH_{2n+1}$ where n=1 to 30 or $CH_2OR^5$ where $R^5=C_mH_{2m+1}$ where m=1 to 12, (b) at least one copolymerizable, ethylenically unsaturated organic compound of the general formula (A)

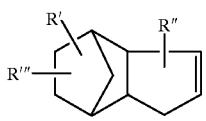

where R' and R" can be identical to or different from one another and are H,$C_pH_{2p=1}$ where p=1 to 6, cycloalkyl, aryl or aralkyl and R'" is acryloyl, methacryloyl, ethacryloyl or cinnamoyl, or is a radical derived from maleic acid, fumaric acid or crotonic acid, and mixtures thereof with free radical polymerizable monomers different from component (a) and c) at least one copolymerizable, ethylenically unsaturated, aromatic or partially aromatic ketone which in the excited triplet state is capable of abstracting hydrogen and, thus, to act as a UV photoinitiator.

11. A method as claimed in 10, wherein component (b) is at least one compound selected from the group consisting of dihydrodicyclopentadienyl acrylate, dihydrodicyclopentadienyl methacrylate, dihydrodicyclopentadienyl ethacrylate and dihydrodicyclopentadienyl cinnamate.

12. A method as claimed in claim 10, wherein the copolymers have glass transition temperatures of from 20° C. to 140° C.

13. A method as claimed on claim 10, wherein at least some of component(a) of the copolymers, incorporated by polymerization, is at least one compound selected from the group consisting of isobornyl acrylate, isobornyl methacrylate, isobornyl ethacrylate, isobornyl cinnamate, adamantane acrylate, adamantane methacrylate, adamantane ethacrylate, adamantane cinnamate, alkyl acrylates or methacrylates having from 1 to 10 carbons atoms in the alkyl radical, and mixtures thereof with at least one member selected from the group consisting of glycidyl acrylate or methacrylate and acrylic or methacrylic acid.

14. A method as claimed in claim 10, wherein some of component (b) of the copolymers, incorporated by polymerization, is at least one compound selected from the group consisting of styrene, 4-tert butylstyrene and 1-methylstyrene.

15. A method as claimed in claim 10, wherein the copolymers are polymerized in solution and the powder coating materials are prepared from the solution by spray drying, optionally following the addition of pigments and auxiliaries.

16. A method as claimed in claim 10, wherein the powder coatings are applied to the surface of the substrate to be coated and once applied they are melted by heating and, after having formed a coating which has flowed out evenly but is still liquid, are crosslinked by UV irradiation or crosslinked by UV rays after partial or complete cooling.

17. A method as claimed in claim 10, wherein the copolymers, before being processed further to give powder coatings, are mixed with solid, ethylenically unsaturated, monomeric, oligomeric or polymeric substances in a ratio of from 90:10 to 10:90.

18. A method as claimed in claim 16, wherein the powder coating contains one or more UV stabilizers.

19. A method as claimed in claim 10, wherein at least some of component (a) of the copolymers, incorporated by polymerization, is at least one compound selected from the group consisting of isobornyl acrylate, isobornyl methacrylate, isobornyl ethacrylate, isobornyl cinnamate, adamantane acrylate, adamantane methacrylate, adamantane ethacrylate, adamantane cinnamate, alkyl acrylates or methacrylates having from 1 to 10 carbon atoms in the alkyl radical, and mixtures thereof with at least one member of the group consisting of glycidyl acrylate or methacrylate and/or acrylic or methacrylic acid.

20. A method as claimed in claim 10 wherein component (c) of the copolymers is copolymerized in a quantity of from 10 to 50% by weight, based on the total quantity of components (a), (b), and (c), and is at least one copolymerizable, compound selected from the group consisting of ethylenically unsaturated acetophenone derivatives and benzophenone derivatives which in the excited triplet state is capable of abstracting hydrogen and, thus to act as a UV photoinitiator and which has no phenyl group with a free hydroxyl group in the ortho-position to the carbonyl group of the phenone parent structure.

* * * * *